(12) United States Patent
Dhameja

(10) Patent No.: US 11,983,190 B2
(45) Date of Patent: May 14, 2024

(54) SYSTEM AND METHOD FOR CONFIGURABLE AND AUTOMATED DATA EXTRACTION, FORMATTING AND DISTRIBUTION

(71) Applicant: JPMorgan Chase Bank, N.A., New York, NY (US)

(72) Inventor: Girish Dhameja, Jersey City, NJ (US)

(73) Assignee: JPMORGAN CHASE BANK. N.A., New York, NY (US)

( * ) Notice: Subject to any disclaimer, the term of this patent is extended or adjusted under 35 U.S.C. 154(b) by 0 days.

(21) Appl. No.: 18/143,642

(22) Filed: May 5, 2023

(65) Prior Publication Data

US 2023/0306040 A1    Sep. 28, 2023

Related U.S. Application Data

(63) Continuation of application No. 17/341,790, filed on Jun. 8, 2021, now Pat. No. 11,681,722.

(51) Int. Cl.
  *G06F 16/25*    (2019.01)
  *G06F 3/04817*    (2022.01)
  *G06F 16/242*    (2019.01)

(52) U.S. Cl.
  CPC ........ *G06F 16/254* (2019.01); *G06F 3/04817* (2013.01); *G06F 16/2423* (2019.01); *G06F 16/258* (2019.01)

(58) Field of Classification Search
  CPC ............... G06F 16/254; G06F 3/04817; G06F 16/2423; G06F 16/258; G06F 3/0482
  See application file for complete search history.

(56) References Cited

U.S. PATENT DOCUMENTS

| | | | | |
|---|---|---|---|---|
| 2011/0282863 | A1* | 11/2011 | Cohen ............... | G06F 16/24573 707/711 |
| 2012/0123996 | A1* | 5/2012 | Krinsky .............. | G06F 16/9577 707/602 |
| 2016/0063080 | A1* | 3/2016 | Nano .................... | G06F 16/254 707/602 |
| 2016/0179897 | A1* | 6/2016 | Zheng .................. | G06F 16/289 707/722 |

\* cited by examiner

*Primary Examiner* — Cam Y T Truong
(74) *Attorney, Agent, or Firm* — GREENBLUM & BERNSTEIN, P.L.C.

(57) ABSTRACT

Various methods, apparatuses/systems, and media for implementing an automated data extraction, formatting, and distribution module are disclosed. A receiver receives input data to create a feed from a user via a user interface (UI). A processor operatively coupled to the receiver defines reusable data sets to be utilized for creating the feed; and selects desired number of a plurality of first selectable icons for selecting exact data from the reusable data sets required for creating the feed. Each of the selected first selectable icon is associated with a corresponding data source having columns to supply the exact data from the reusable data sets. The processor selects desired number of a plurality of second selectable icons for selecting a desired transformation or formatting process needed for the columns of each data source; creates the feed and defines a custom distribution process of the created feed from the UI.

14 Claims, 15 Drawing Sheets

FIG. 7

Select Data Source Columns

Choose the columns from each data source that you would like to associate to this field.

▼ Employee Data Source, ID: 503185

| 1002 | Name | Type | Data | Mapping Field Na... | Join key Name | Join Order | Unsorted | Column Width | Column Order |
|---|---|---|---|---|---|---|---|---|---|
| ☐ | Employee Id | Integer | Employee Id | EMPLOYEE_ID | employee_id | 1 | N | 10 | 1 |
| ☐ | Manager Id | Integer | Manager Id | MANAGER_ID | manager_id | 1 | N | 10 | 2 |
| ☐ | Project Id | Integer | Project Id | PROJECT_ID | project_id | 1 | N | 10 | 3 |
| ☐ | Employee Name | String | Employee Name | EMPLOYEE_NAME | | 0 | N | 100 | 4 |
| ☐ | Employee Title | String | Employee Title | TITLE | | 0 | N | 2 | 5 |

Page 1 of 1    Totals: 5

SYSTEM AND METHOD FOR CONFIGURABLE AND AUTOMATED DATA EXTRACTION, FORMATTING AND DISTRIBUTION

CROSS-REFERENCE TO RELATED APPLICATIONS

This application is a Continuation of U.S. patent application Ser. No. 17/341,790, filed on Jun. 8, 2021, the entire disclosure of which is expressly incorporated by reference herein.

TECHNICAL FIELD

This disclosure generally relates to data processing, and, more particularly, to methods and apparatuses for implementing an automated data extraction, formatting, and distribution module that implements a configuration or user interface (UI) driven approach for extracting data, formatting and distributing the data to other systems in a chain.

BACKGROUND

The developments described in this section are known to the inventors. However, unless otherwise indicated, it should not be assumed that any of the developments described in this section qualify as prior art merely by virtue of their inclusion in this section, or that those developments are known to a person of ordinary skill in the art.

Today, data extraction and distribution process may involve creating ad-hoc processes, which then may need to have a defined software development life cycle and maintenance overhead. There are conventional tools available in the market that may perform ETL (Extract, Transform & Load), but all these tools may require development effort for every new extraction and transformation, and the data set may not be shared between different extraction processes. In addition, these conventional ETL tools may also be largely code generators which may not be open systems creating captive audience situation and vendor lock-in, which yields multiple millions of dollars of licensing spend for an organization. Many of these conventional ETL tools are often not aligned with an application toolchain perpetuating quality assurance scenarios affecting developer productivity and legacy rationalization and modernization adversely.

Moreover, these conventional ETL tools are designed to load the data into a database, and not for distributing the data. Another key limitation of these tools may be the fact that the trigger mechanism is outside the purview of the tool. This existing approach in ETL may have a plurality of problems among others including requiring significant Time-to-Market (TTM) to build and release new extraction and distribution processes; requiring a team of software engineers and support operators to define and maintain the processes; requiring designing and building trigger mechanisms; requiring a user to have an in-depth knowledge on Structured Query Language (SQL) for even basic ETL definitions, etc., thereby significantly increasing cost and complexity.

SUMMARY

The present disclosure, through one or more of its various aspects, embodiments, and/or specific features or sub-components, provides, among other features, various systems, servers, devices, methods, media, programs, and platforms for an automated data extraction, formatting and distribution module that implements a configuration or user interface (UI) driven approach for extracting data, formatting and distributing the data to other systems in a chain, thereby requiring no development or deployment effort for new feeds (i.e., data in a particular format), but the disclosure is not limited thereto. For example, the automated data extraction, formatting and distribution module of the present disclosure allows for configuring new data extraction processes right from the UI, thereby reducing TTM and any need for a software engineering team to be involved for creating new processes, integrating with event and time based triggers and reusable data sets; reutilizing data sets between processes, thereby eliminating the need to maintain the same data extraction setup between different processes and thus reducing maintenance costs, but the disclosure is not limited thereto. According to exemplary embodiments, a trigger, which could be a one-time trigger, or a recurring trigger, or an event based trigger, that initiates the created feed generation, formatting and distribution.

The various aspects, embodiments, features, and/or sub-components may also provide optimized processes of implementing an automated data extraction, formatting and distribution module that implements the following processes, including but not limited thereto: UI driven approach to defining extraction, transformation and distribution logic; plug-n-play architecture to allow for framework expansion points (for instance, easily add another data source such as Hive); built in trigger mechanism to not only define the extraction process, but also define when the extraction needs to be executed—from one time trigger to always on triggers; separation of data extraction from transformation and distribution that enables data sets to be reused between multiple extraction processes; configuration driven auto retry and rerun mechanism to cater for process failures; controls to allow for multi-tenancy usage with data and runtime segregation, etc., but the disclosure is not limited thereto.

A feed may generally refer to a file that has the required data in a particular format. However, in the automated data extraction, formatting and distribution module (may also be referred to as a feed engine) of the instant disclosure, the term feed has been utilized as formatted data. It doesn't necessarily have to be a file. The data can also be stored in an RDBMS (Relational Database Management System) database, but the disclosure is not limited thereto.

A data source as disclosed herein may refer to a source for the data. It can be a database, a file, NoSQL store, etc., but the disclosure is not limited thereto.

A data set as disclosed herein may refer to a logical representation of some data. For instance, an employee table in an RDBMS database is a data set. One novel aspect, among others, of the automated data extraction, formatting and distribution module (feed engine) as disclosed herein is that it allows data sets to be reused, but the disclosure is not limited thereto. Conventional tools lack this feature of reusing data sets.

A trigger as disclosed herein may be a mechanism by which the data extraction process will be initiated, but the disclosure is not limited thereto.

According to an aspect of the present disclosure, a method for implementing an automated data extraction, formatting, and distribution module by utilizing one or more processors and one or more memories is disclosed. The method may include: receiving input data to create a feed from a user via a user interface (UI); defining, in response to receiving the input data to create the feed, reusable data sets to be utilized for creating the feed; displaying onto the UI a plurality of first selectable icons for selecting exact data from the reusable data sets required for creating the feed; selecting a desired number of the plurality of first selectable icons, wherein each of the selected first selectable icon is associated with a corresponding data source having columns to supply the exact data from the reusable data sets, displaying onto the UI a plurality of second selectable icons for selecting a desired transformation or formatting process needed for the columns of each data source; selecting a desired number of the plurality of second selectable icons to select the desired transformation or formatting process; creating the feed in response to selecting the desired transformation or formatting process; and defining a custom distribution process of the created feed from the UI.

According to another aspect of the present disclosure, the method may further include defining a custom trigger to initiate the extraction and distribution process (schedule, event based or one-off), but the disclosure is not limited thereto.

According to yet another aspect of the instant disclosure, wherein the custom distribution process may further include: distributing the created feed to a plurality of systems with different file names or at different locations using any of the distribution mechanisms such as sFTP, email, cloud storage or loading it to a database, but the disclosure is not limited thereto.

According to a further aspect of the instant disclosure, wherein the created feed may be a formatted data that can be stored in a database management system that may incorporate a relational-data model including a Structured Query Language (SQL) application programming interface, but the disclosure is not limited thereto.

According to an additional aspect of the instant disclosure, wherein each data set may be a logical representation of some data that can be reused.

According to yet another aspect of the instant disclosure, wherein the data source may be selected from one or more of the following: a database, a file, a WebService call, a script, a NoSQL (NoStructured Query Language) store, another process, etc. but the disclosure is not limited thereto.

According to yet another aspect of the instant disclosure, the method may further include: separating data extraction process from transformation and distribution process; and reusing the reusable data sets between multiple extraction processes.

According to a further aspect of the instant disclosure, the method may further include implementing a plug-n-play architecture to allow for framework expansion points.

According to another aspect of the instant disclosure, a system for implementing an automated data extraction, formatting, and distribution module is disclosed. The system may include: a receiver that receives input data to create a feed from a user via a user interface (UI); and a processor operatively coupled to the receiver via a communication network. The processor may be configured to: define, in response to receiving the input data to create the feed, reusable data sets to be utilized for creating the feed; display onto the UI a plurality of first selectable icons for selecting exact data from the reusable data sets required for creating the feed; select a desired number of the plurality of first selectable icons, wherein each of the selected first selectable icon is associated with a corresponding data source having columns to supply the exact data from the reusable data sets; display onto the UI a plurality of second selectable icons for selecting a desired transformation or formatting process needed for the columns of each data source; select a desired number of the plurality of second selectable icons to select the desired transformation or formatting process; create the feed in response to selecting the desired transformation of formatting process; and define a custom distribution process of the created feed from the UI.

According to yet another aspect of the instant disclosure, the processor may be further configured to distribute the created feed to a plurality of systems with different file names or at different locations using any of the distribution mechanisms such as sFTP, email, cloud storage or loading it to a database, but the disclosure is not limited thereto.

According to a further aspect of the instant disclosure, the processor may be further configured to separate data extraction process from transformation and distribution process; and reuse the reusable data sets between multiple extraction processes.

According to yet another aspect of the instant disclosure, the processor may be further configured to implement a plug-n-play architecture to allow for framework expansion points.

According to yet another aspect of the present disclosure, a non-transitory computer readable medium configured to store instructions for implementing an automated data extraction, formatting, and distribution module is disclosed. The instructions, when executed, cause a processor to perform the following: causing a receiver to receive input data to create a feed from a user via a user interface (UI); defining, in response to receiving the input data to create the feed, reusable data sets to be utilized for creating the feed; displaying onto the UI a plurality of first selectable icons for selecting exact data from the reusable data sets required for creating the feed; selecting a desired number of the plurality of first selectable icons, wherein each of the selected first selectable icon is associated with a corresponding data source having columns to supply the exact data from the reusable data sets; displaying onto the UI a plurality of second selectable icons for selecting a desired transformation or formatting process needed for the columns of each data source; selecting a desired number of the plurality of second selectable icons to select the desired transformation or formatting process; creating the feed in response to selecting the desired transformation or formatting process; and defining a custom distribution process of the created feed from the UI.

According to an additional aspect of the instant disclosure, wherein, when executed, the instructions may further cause the processor to perform the following: distributing the created feed to a plurality of systems with different file names or at different locations.

According to a further aspect of the instant disclosure, wherein, when executed, the instructions may further cause the processor to perform the following: separating data extraction process from transformation and distribution process; and reusing the reusable data sets between multiple extraction processes.

According to yet another aspect of the instant disclosure, wherein, when executed, the instructions may further cause the processor to perform the following: implement a plug-n-play architecture to allow for framework expansion points.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

FIG. 7 illustrates an exemplary UI for defining a new feed in accordance with an exemplary embodiment.

FIG. 10 illustrates an exemplary UI for selecting data source columns in accordance with an exemplary embodiment.

FIG. 12 illustrates an exemplary UI for creating a new data source in accordance with an exemplary embodiment.

DETAILED DESCRIPTION

Figure 1:
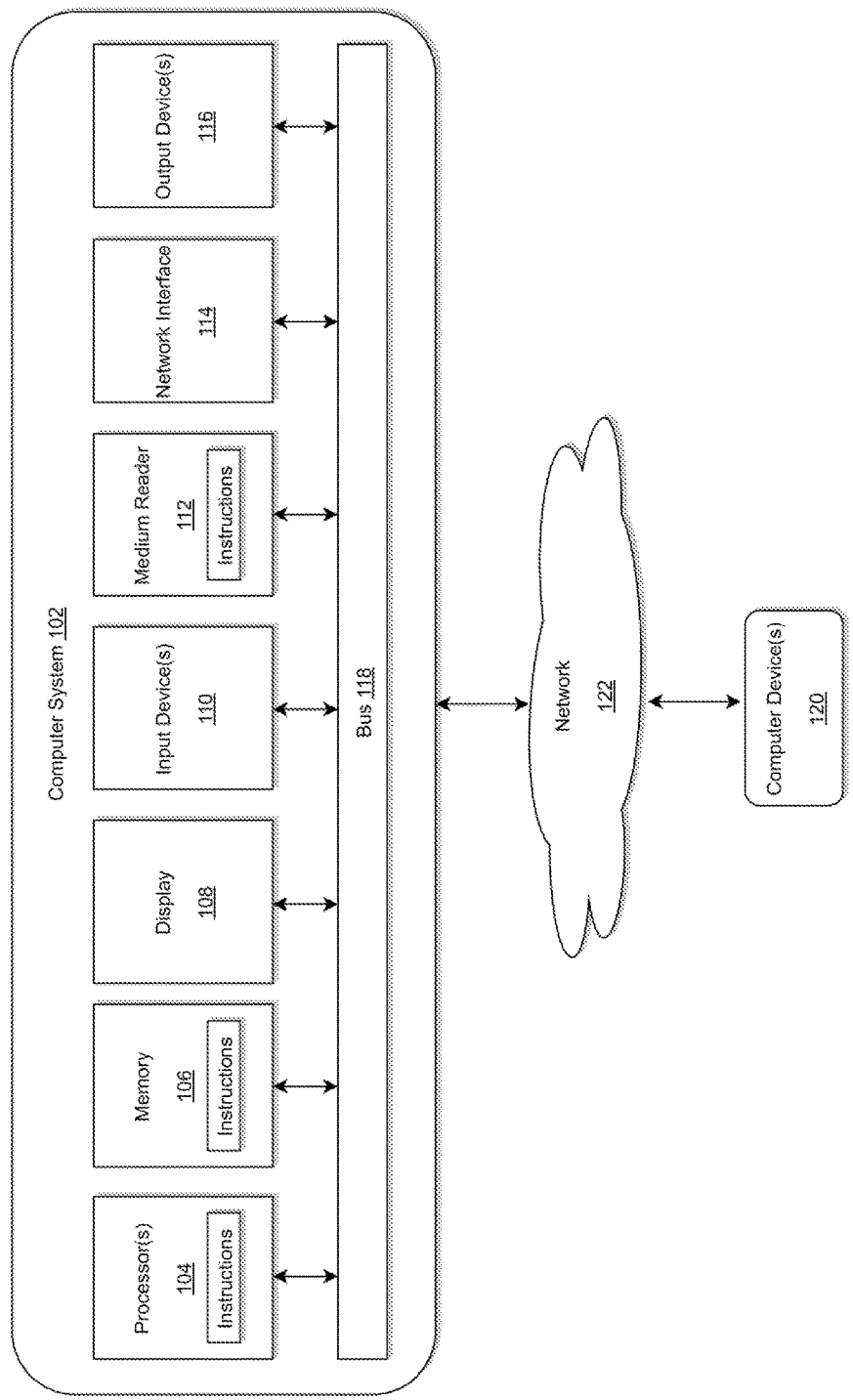
FIG. 1 illustrates a computer system for implementing an automated data extraction, formatting, and distribution device in accordance with an exemplary embodiment.

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units, engines and/or modules. Those skilled in the art will appreciate that these blocks, units, engines and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units, engines and/or modules being implemented by microprocessors or similar, they may be programmed using software (e.g., microcode) to perform various functions discussed herein and may optionally be driven by firmware and/or software. Alternatively, each block, unit, engine and/or module may be implemented by dedicated hardware, or as a combination of dedicated hardware to perform some functions and a processor (e.g., one or more programmed microprocessors and associated circuitry) to perform other functions. Also, each block, unit, engine and/or module of the example embodiments may be physically separated into two or more interacting and discrete blocks, units and/or modules without departing from the scope of the inventive concepts. Further, the blocks, units, engines and/or modules of the example embodiments may be physically combined into more complex blocks, units and/or modules without departing from the scope of the present disclosure.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), register, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and an operation mode having parallel processing capabilities. Virtual computer system processing can be constructed to implement one or more of the methods or functionality as described herein, and a processor described herein may be used to support a virtual processing environment.

Figure 2:
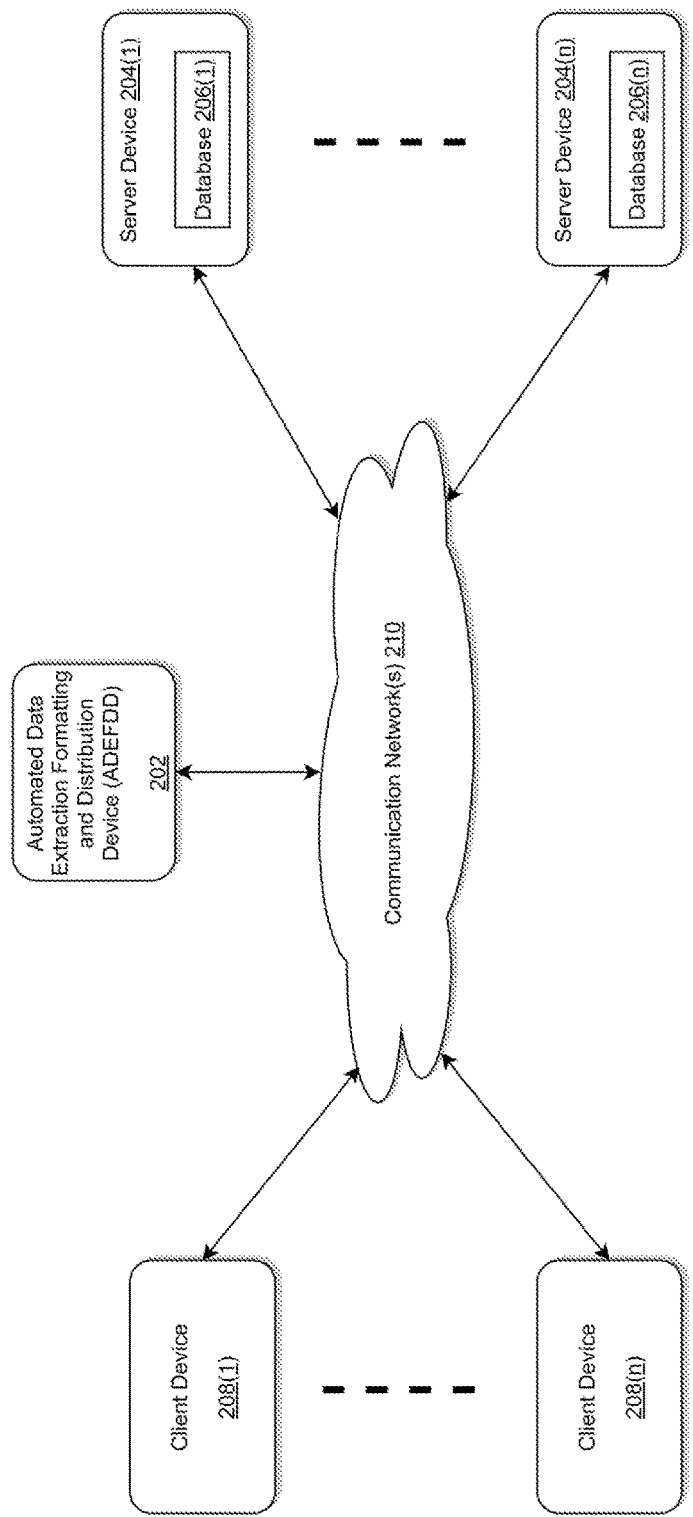
FIG. 2 illustrates an exemplary diagram of a network environment with an automated data extraction, formatting, and distribution device in accordance with an exemplary embodiment.

Referring to FIG. 2, a schematic of an exemplary network environment 200 for implementing an automated data extraction, formatting, and distribution device (ADEFDD) of the instant disclosure is illustrated.

According to exemplary embodiments, the above-described problems associated with conventional approach of testing software application may be overcome by implementing an ADEFDD 202 as illustrated in FIG. 2 that may provide a platform for implementing a configuration or user interface (UI) driven approach for extracting data, formatting and distributing the data to other systems in a chain, thereby requiring no development or deployment effort for new feeds (i.e., data in a particular format), but the disclosure is not limited thereto. For example, the above-described problems associated with conventional approach of testing software application may be overcome by implementing an ADEFDD 202 as illustrated in FIG. 2 that may provide a platform for configuring new data extraction processes right from the UI, thereby reducing TTM and any need for a software engineering team to be involved for creating new processes, integrating with event and time based triggers and reusable data sets; reutilizing data sets between processes, thereby eliminating the need to maintain the same data extraction setup between different processes and thus reducing maintenance costs, but the disclosure is not limited thereto.

The ADEFDD 202 may be the same or similar to the computer system 102 as described with respect to FIG. 1.

The ADEFDD 202 may store one or more applications that can include executable instructions that, when executed by the ADEFDD 202, cause the ADEFDD 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the ADEFDD 202 itself, may be located in virtual server(s) running in a cloud-based computing environment rather than being tied to one or more specific physical network computing devices. Also, the application(s) may be running in one or more virtual machines (VMs) executing on the ADEFDD 202. Additionally, in one or more embodiments of this technology, virtual machine(s) running on the ADEFDD 202 may be managed or supervised by a hypervisor.

In the network environment 200 of FIG. 2, the ADEFDD 202 is coupled to a plurality of server devices 204(1)-204(n) that hosts a plurality of databases 206(1)-206(n), and also to a plurality of client devices 208(1)-208(n) via communication network(s) 210. A communication interface of the ADEFDD 202, such as the network interface 114 of the computer system 102 of FIG. 1, operatively couples and communicates between the ADEFDD 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the ADEFDD 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein.

By way of example only, the communication network(s) 210 may include local area network(s) (LAN(s) or wide area network(s) (WAN(s)), and can use TCP/IP over Ethernet and industry-standard protocols, although other types and/or numbers of protocols and/or communication networks may be used. The communication network(s) 202 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The ADEFDD 202 may be a standalone device or integrated with one or more other devices or apparatuses, such as one or more of the server devices 204(1)-204(n), for example. In one particular example, the ADEFDD 202 may be hosted by one of the server devices 204(1)-204(n), and other arrangements are also possible. Moreover, one or more of the devices of the ADEFDD 202 may be in the same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the ADEFDD 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store metadata sets, data quality rules, and newly generated data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(n) or other client devices 208(1)-208(n).

According to exemplary embodiments, the client devices 208(1)-208(n) in this example may include any type of computing device that can facilitate the implementation of the ADEFDD 202 that may efficiently provide a platform for implementing a configuration or user interface (UI) driven approach for extracting data, formatting and distributing the data to other systems in a chain, thereby requiring no development or deployment effort for new feeds (i.e., data in a particular format), but the disclosure is not limited thereto.

The client devices 208(1)-208(n) may run interface applications, such as standard web browsers or standalone client applications, which may provide an interface to communicate with the ADEFDD 202 via the communication network(s) 210 in order to communicate user requests. The client devices 208(1)-208(n) may further include, among other features, a display device, such as a display screen or touchscreen, and/or an input device, such as a keyboard, for example.

Although the exemplary network environment 200 with the ADEFDD 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the ADEFDD 202, the server devices 204(1)-204(n), or the client devices 208(1)-208(n), for example, may be configured to operate as virtual instances on the same physical machine. For example, one or more of the ADEFDD 202, the server devices 204(1)-204(n), or the client devices 208(1)-208(n) may operate on the same physical device rather than as separate devices communicating through communication network(s) 210. Additionally, there may be more or fewer ADEFDDs 202, server devices 204(1)-204(n), or client devices 208(1)-208(n) than illustrated in FIG. 2. According to exemplary embodiments, the ADEFDD 202 may be configured to send code at run-time to remote server devices 204(1)-204(n), but the disclosure is not limited thereto.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
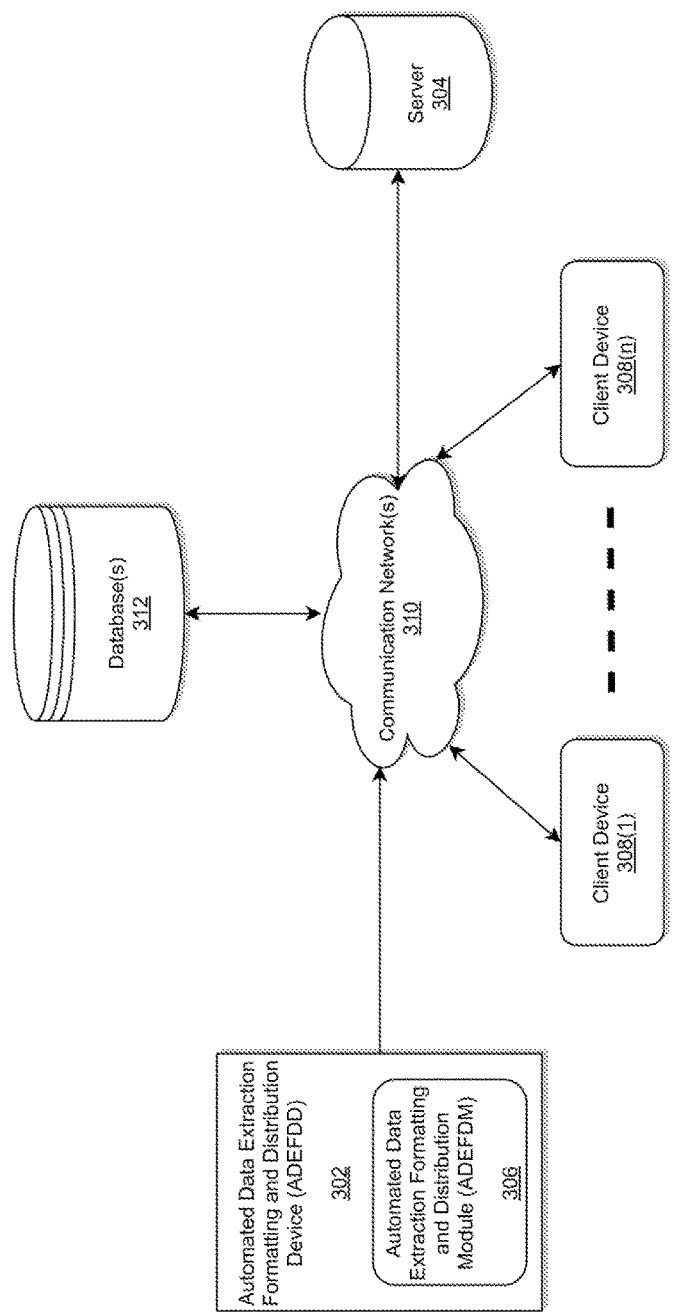
FIG. 3 illustrates a system diagram for implementing an automated data extraction, formatting, and distribution device having an automated data extraction, formatting, and distribution module in accordance with an exemplary embodiment.

FIG. 3 illustrates a system diagram for implementing an ADEFDD having an automated data extraction, formatting and distribution module (ADEFDM) in accordance with an exemplary embodiment.

As illustrated in FIG. 3, the system 300 may include an ADEFDD 302 within which an ADEFDM 306 is embedded, a server 304, a database(s) 312, a plurality of client devices 308(1) . . . 308(n), and a communication network 310.

According to exemplary embodiments, the ADEFDD 302 including the ADEFDM 306 may be connected to the server 304, and the database(s) 312 via the communication network 310. Although there is only one database has been illustrated, the disclosure is not limited thereto. Any number of databases may be utilized. The ADEFDD 302 may also be connected to the plurality of client devices 308(1) . . . 308(n) via the communication network 310, but the disclosure is not limited thereto.

According to exemplary embodiment, the ADEFDD 302 is described and shown in FIG. 3 as including the ADEFDM 306, although it may include other rules, policies, modules, databases, or applications, for example. According to exemplary embodiments, the database(s) 312 may be embedded within the ADEFDD 302. According to exemplary embodiments, the database(s) 312 may be configured to store configurations that may include feed setup, supported output formats, supported data sources etc., but the disclosure is not limited thereto.

According to exemplary embodiments, the ADEFDM 306 may be configured to receive real-time feed of data from the plurality of client devices 308(1) . . . 308(n) via the communication network 310.

According to exemplary embodiments, as will be described below, the ADEFDM 306 may be configured to cause a receiver to receive input data to create a feed from a user via a user interface (UI); define, in response to receiving the input data to create the feed, reusable data sets to be utilized for creating the feed; display onto the UI a plurality of first selectable icons for selecting exact data from the reusable data sets required for creating the feed; select a desired number of the plurality of first selectable icons, wherein each of the selected first selectable icon is associated with a corresponding data source having columns to supply the exact data from the reusable data sets; display onto the UI a plurality of second selectable icons for selecting a desired transformation or formatting process needed for the columns of each data source; select a desired number of the plurality of second selectable icons to select the desired transformation of formatting process; create the feed in response to selecting the desired transformation or formatting process; and define a custom distribution process of the created feed from the UI, but the disclosure is not limited thereto.

The plurality of client devices 308(1) . . . 308(n) are illustrated as being in communication with the ADEFDD 302. In this regard, the plurality of client devices 308(1) . . . 308(n) may be "clients" of the ADEFDD 302 and are described herein as such. Nevertheless, it is to be known and understood that the plurality of client devices 308(1) . . . 308(n) need not necessarily be "clients" of the ADEFDD 302, or any entity described in association therewith herein. Any additional or alternative relationship may exist between either or both of the plurality of client devices 308(1) . . . 308(n) and the ADEFDD 302, of no relationship may exist.

The first client device 308(1) may be, for example, a smart phone. Of course, the first client device 308(1) may be any additional device described herein. The second client device 308(n) may be, for example, a personal computer (PC). Of course, the second client device 308(n) may also be any additional device described herein. According to exemplary embodiments, the server 304 may be the same or equivalent to the server device 204 as illustrated in FIG. 2.

The process may be executed via the communication network 310, which may comprise plural networks as described above. For example, in an exemplary embodiment, one or more of the plurality of client devices 308(1) . . . 308(n) may communicate with the ADEFDD 302 via broadband or cellular communication. Of course, these embodiments are merely exemplary and are not limiting or exhaustive.

The computing device 301 may be the same or similar to any one of the client devices 208(1)-208(n) as described with respect to FIG. 2, including any features or combination of features described with respect thereto. The ADEFDD 302 may be the same or similar to the ADEFDD 202 as described with respect to FIG. 2, including any features or combination of features described with respect thereto.

Figure 4:
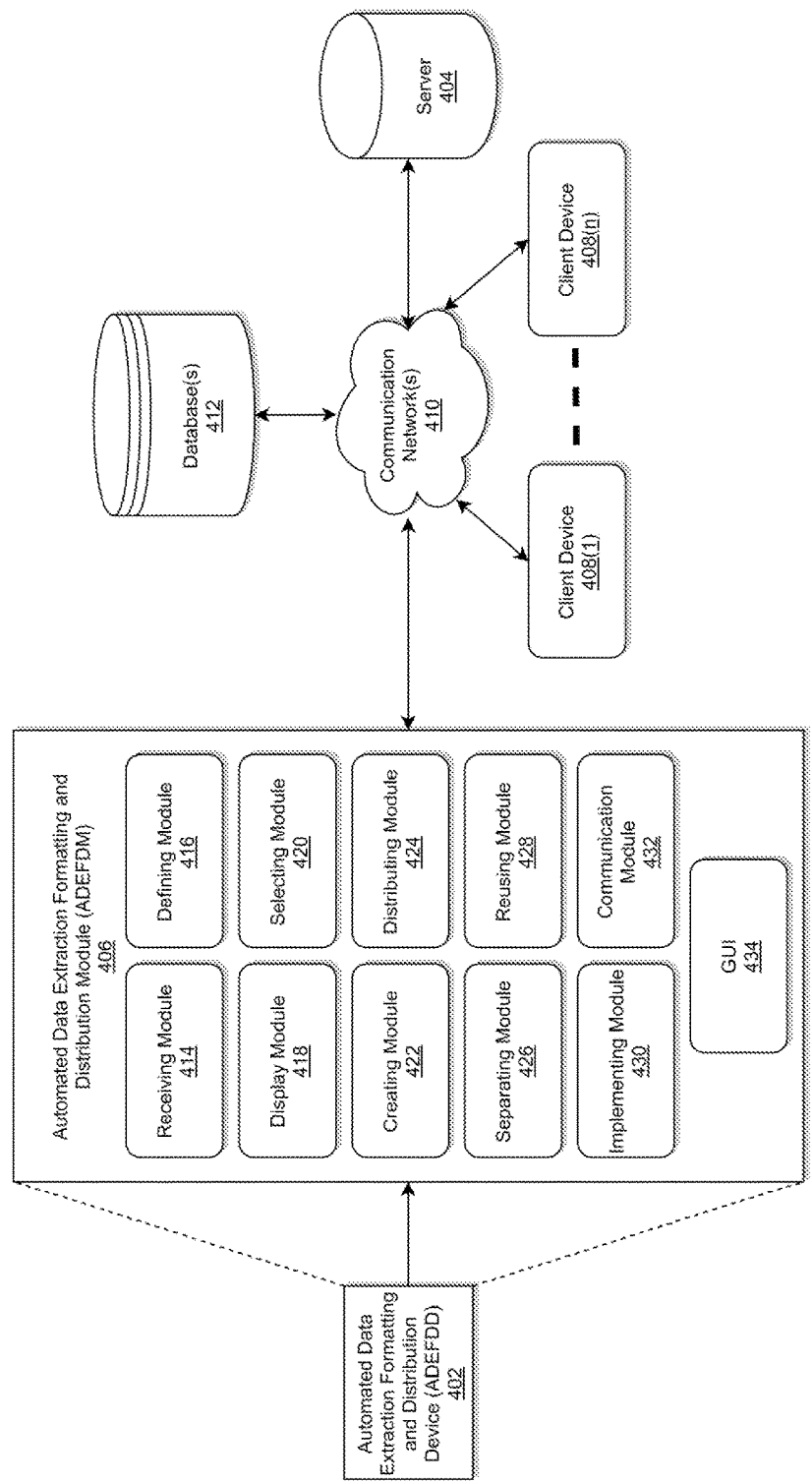
FIG. 4 illustrates a system diagram for implementing an automated data extraction, formatting, and distribution module of FIG. 3 in accordance with an exemplary embodiment.

FIG. 4 illustrates a system diagram for implementing an automated data extraction, formatting, and distribution module (ADEFDM) of FIG. 3 in accordance with an exemplary embodiment.

According to exemplary embodiments, the system 400 may include an automated data extraction, formatting, and distribution device (ADEFDD) 402 within which an ADEFDM 406 is embedded, a server 404, a database(s) 412, and a communication network 410.

According to exemplary embodiments, the ADEFDD 402 including the ADEFDM 406 may be connected to the server 404, and the database(s) 412 via the communication network 410. The ADEFDD 402 may also be connected to the plurality of client devices 408(1) . . . 408(n) via the communication network 410, but the disclosure is not limited thereto. According to exemplary embodiments, the ADEFDD 402, the ADEFDM 406, the database(s) 412, the server 404, the client devices 408(1)-408(n), and the communication network 410 as illustrated in FIG. 4 may be the same or similar to the ADEFDD 302, the ADEFDM 306, the database(s) 312, the server 304, the client devices 308(1)-308(n), and the communication network 310, respectively, as illustrated in FIG. 3.

According to exemplary embodiments, as illustrated in FIG. 4, the ADEFDM 406 may include a receiving module 414, a defining module 416, a display module 418, a selecting module 420, a creating module 422, a distributing module 424, a separating module 426, a reusing module 428, an implementing module 430, a communication module 432, and a GUI 434.

According to exemplary embodiments, the ADEFDM 406 may also be referred to as feed engine as illustrated in FIGS. 5-14.

The process may be executed via the communication module 432 and the communication network 410, which may comprise plural networks as described above. For example, in an exemplary embodiment, the various components of the ADEFDM 406 may communicate with the server 404, and the database(s) 412 via the communication module 432 and the communication network 410. Of course, these embodiments are merely exemplary and are not limiting or exhaustive.

According to exemplary embodiments, the communication network 410 and the communication module 432 may be configured to establish a link between the database(s) 412, the client devices 408(1)-408(n) and the ADEFDM 406.

According to exemplary embodiments, each of the receiving module 414, defining module 416, display module 418, selecting module 420, creating module 422, distributing module 424, separating module 426, reusing module 428, implementing module 430, and the communication module 432 may be implemented by microprocessors or similar, they may be programmed using software (e.g., microcode) to perform various functions discussed herein and may optionally be driven by firmware and/or software. Alternatively, each of the receiving module 414, defining module 416, display module 418, selecting module 420, creating module 422, distributing module 424, separating module 426, reusing module 428, implementing module 430, and the communication module 432 may be implemented by dedicated hardware, or as a combination of dedicated hardware to perform some functions and a processor (e.g., one or more programmed microprocessors and associated circuitry) to perform other functions. Also, according to exemplary embodiments, each of the receiving module 414, defining module 416, display module 418, selecting module 420, creating module 422, distributing module 424, separating module 426, reusing module 428, implementing module 430, and the communication module 432 may be physically separated into two or more interacting and discrete blocks, units, devices, and/or modules without departing from the scope of the inventive concepts.

According to exemplary embodiments, each of the receiving module 414, defining module 416, display module 418, selecting module 420, creating module 422, distributing module 424, separating module 426, reusing module 428, implementing module 430, and the communication module 432 of the ADEFDM 406 may be called by corresponding API, but the disclosure is not limited thereto.

Figure 5:
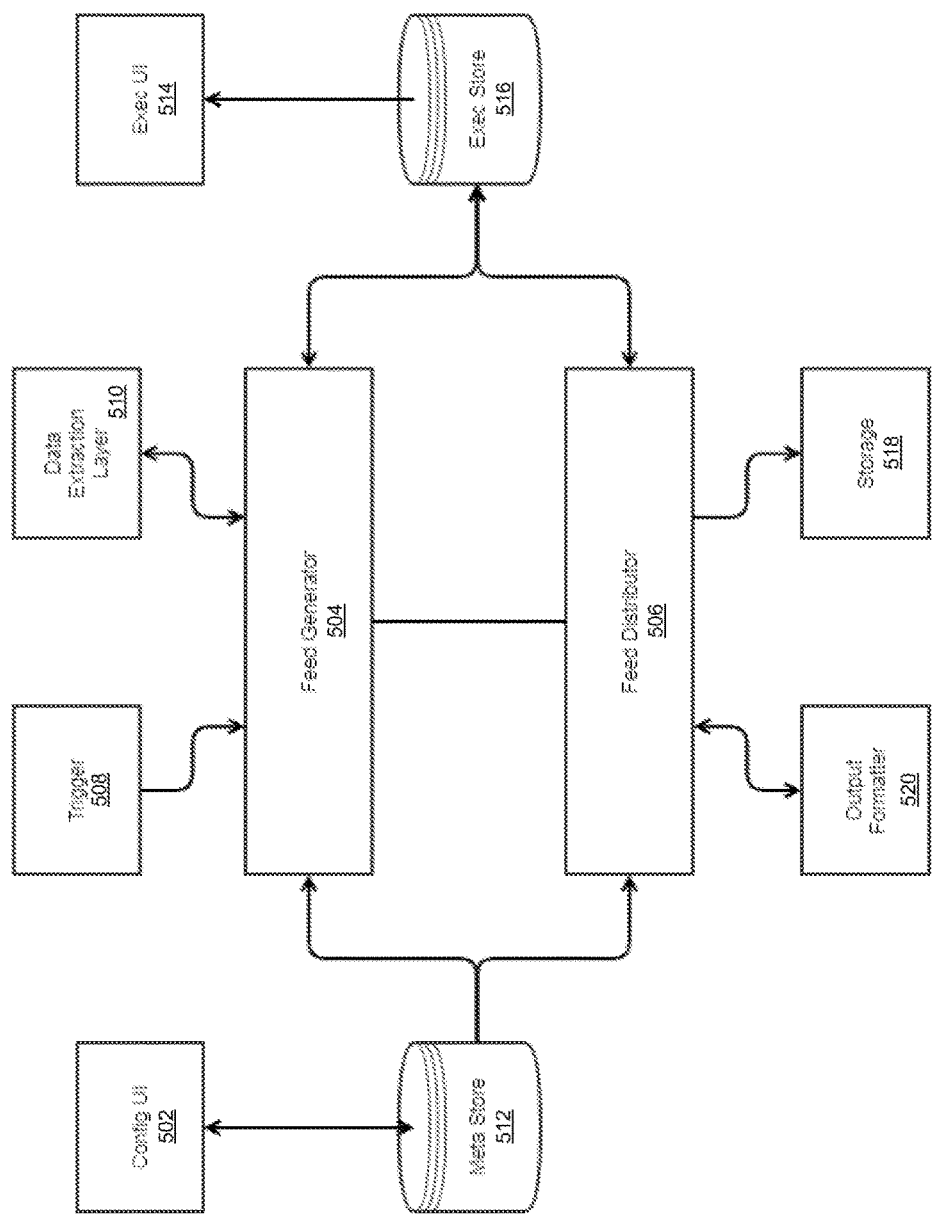
FIG. 5 illustrates a high-level system diagram of implementing an automated data extraction, formatting, and distribution module of FIG. 4 in accordance with an exemplary embodiment.

According to exemplary embodiments, FIG. 5 illustrates a high-level system diagram 500 of implementing an automated data extraction, formatting, and distribution module of FIG. 4 in accordance with an exemplary embodiment. As illustrated in FIG. 5, the high-level system diagram 500 may include a configuration UI 502 (i.e., a metadata UI), a feed generator 504, a feed distributor 506, a trigger 508 (i.e., a trigger module), a data extraction layer 510, a meta store 512, an extraction and analytics UI 514, an execution store 516, an output formatter 520, and a storage.

According to exemplary embodiments, the Meta store 512 is a database that may be configured to store all configurations. These configurations may include feed setup, supported output formats, supported data sources, etc., but the disclosure is not limited thereto.

According to exemplary embodiments, the execution store 516 is a database that may be configured to store data related to tracking all the feeds in progress and historic data around feed execution. Thus, the ADEFDM 406 may implement processes of recovering from a system failure and implement the processes of reruns.

The configuration UI 502 may be a metadata UI. The execution and analytics UI 514 may be utilized to look at the historic runs and get more details around number of feeds executed, time-frames, performance aspect, etc., but the disclosure is not limited thereto. The execution and analytics UI 514 enables entitled users to rerun feeds and provide support. The configuration UI 502 allows configurations. For example, a new feed may be configured right from the configuration UI 502.

The trigger 508 may include two components that can trigger a feed—event listener and scheduler. According exemplary embodiments, the event listener of the trigger 508 may allow the feed to be triggered based on an event. Events can vary and may include Kafka events, MQ events, other Feeds etc., but the disclosure is not limited thereto. The event listener of the trigger 508 may also provide the ability to read the event and extract information from the event and make it available to the rest of the execution process.

According to exemplary embodiments, the scheduler (timer) component of the trigger 508 may be a time based trigger. For example, a feed can be setup to run every day at 5 pm (or every business day at 5 pm), but the disclosure is not limited thereto. It is the scheduler component of the trigger 508 that tracks these time dependencies. In addition, according to exemplary embodiments, the scheduler component of the trigger 508 may be integrated with a holiday calendar.

According to exemplary embodiments, the trigger mechanism implemented by the trigger 508 may also be an extension point that enables additional triggers to be registered.

According to exemplary embodiments, the data extraction layer (DExL) 510 may allow communicating with the defined data source to get the data needed by the feed. DExL 510 and the output formatter 520, in accordance exemplary embodiments may be deliberately separated out because the same set of data can be formatted and shipped to multiple downstream systems, thereby implementing an "extract once and format multiple times" model.

According to exemplary embodiments, there can be multiple different types of data sources, including but not limited thereto: APIs—a feed can source the data by calling an API that returns JSON; Database Query (Parameterized query)—a feed can source the data from a traditional RDMS database; NoSQL Database; Feeds—mainframe systems interact with each other based on feeds and it should be possible to define a feed as another source.

According to exemplary embodiments, some key features of DExL 510 may include but not limited thereto: parallel execution—each data source can be executed in parallel. However, it is possible to define dependencies between the data sources which will force the execution to be serialized; extensibility—it is possible to extend the layer and add support for other data source types. For instance, if support is required for fetching data from S3 (i.e., cloud storage), it is possible to easily extend the layer and add support for S3.

According to exemplary embodiments, the output formatter 520 may be configured to format the feed in a specified format. One feed can have multiple formatters specified, one per downstream system. A key aspect of plug-n-play architecture is to provide extension points. Thus, according to exemplary embodiments, the output formatter 520 may be an extension point that allows custom formatters to be designed and registered, allowing feeds to use custom formatters. Once registered with the engine, i.e., the ADEFDM 406 as illustrated in FIG. 4, the output formatter 520 can be reused across other feeds. This is one of the key reusability features, among others of the engine.

According to exemplary embodiments, the ADEFDM 406 may include the feed generator 504 and the feed distributor 506. The feed generator 504 may behave as an orchestration layer. When an event happens, the feed generator 504 knows what feeds need to be generated. The feed generator 504 looks up the metadata for the feed from the meta store 512, calls DExL 510 to get the data, combines all the data together, calls the output formatter 520 to format the feed and saves it at the specified location. The feed generator 504 also enables concurrency and throttling based on resources.

According to exemplary embodiments, some key aspects of the feed generator 504 may include, but not limited thereto: orchestration between different components; failure detection and auto rerun capability on failure based on configuration; multi-threaded to allow for multiple feed executions at the same time per instance; dependency management that allows for one feed to depend on multiple triggers.

According to exemplary embodiments, the feed distributor 506 may be configured to distribute the feed. Same feed can go to multiple systems with different file names or at different locations. The feed distributor 506, according to exemplary embodiments, enables the behavior where the feed is generated once but distributed multiple times.

According to exemplary embodiments the feed distributor 506 may distribute the feed by utilizing one or more of the following data distribution processes: email communication may be utilized to distribute the data for user's consumption; sFTP may be utilized to distribute the data for system consumption; AWS S3 may be utilized to distribute data by setting up S3 buckets; signed URLs can be generated and distributed to partner systems and/or users for data consumption; populating a database, etc., but the disclosure is not limited thereto.

According to exemplary embodiments, the feed distributor 506 may be another key extension point and allows for custom distributions. For instance, Azure storage can be added as another distribution mechanism. Once added, it may be available as a core distribution to be reused.

Scalability may prove to be very critical for a hosted service. As more and more teams get on-boarded and use the service, it becomes important to make sure the service can scale without any noticeable performance degradation. According to exemplary embodiments, there may be two layers at which the ADEFDM 406 needs to scale: database and process.

According to exemplary embodiments, the ADEFDM 406 (i.e., feed engine) may be designed to be active-active in multiple data centers with multiple instances running in each data center. A data extraction process should be executed exactly once; this is a key requirement. According to exemplary embodiments, the data extraction, formatting and distribution process should not be duplicated. There may be various ways to achieve this process of no duplicating the data extraction, formatting and distribution.

For example, in the ADEFDM 406 (i.e., in feed engine), this process of no duplicating the data extraction, formatting and distribution may be implemented at the database layer.

Since the metadata used for each feed is limited, a traditional RDBMS can suffice the needs.

Alternatively, the following processes may also be implemented by the ADEFDM 406 to achieve this result. For example, Apache ZooKeeper may be utilized for distributed synchronization. Kafka uses ZooKeeper heavily for its internal processes. A distributed Database, e.g., a CockroachDB may be utilized, which maintains ACID (atomicity, consistency, isolation, durability), instead of a traditional RDBMS such as Oracle.

Referring to FIG. 4, according to exemplary embodiments, the ADEFDM 406 may be configured to provide database scalability. All the metadata that defines the process of extraction, data sets, distribution, exception handling etc., are all stored in a database 412. However, the metadata size may be limited and hence a traditional RDBMS can suffice. According to exemplary embodiments, the database 412 can be set up in manner such that it is synchronously backed up. A read replica for the database 412 may provide performance benefits, especially if a read replica is added in each data center.

Figure 6:
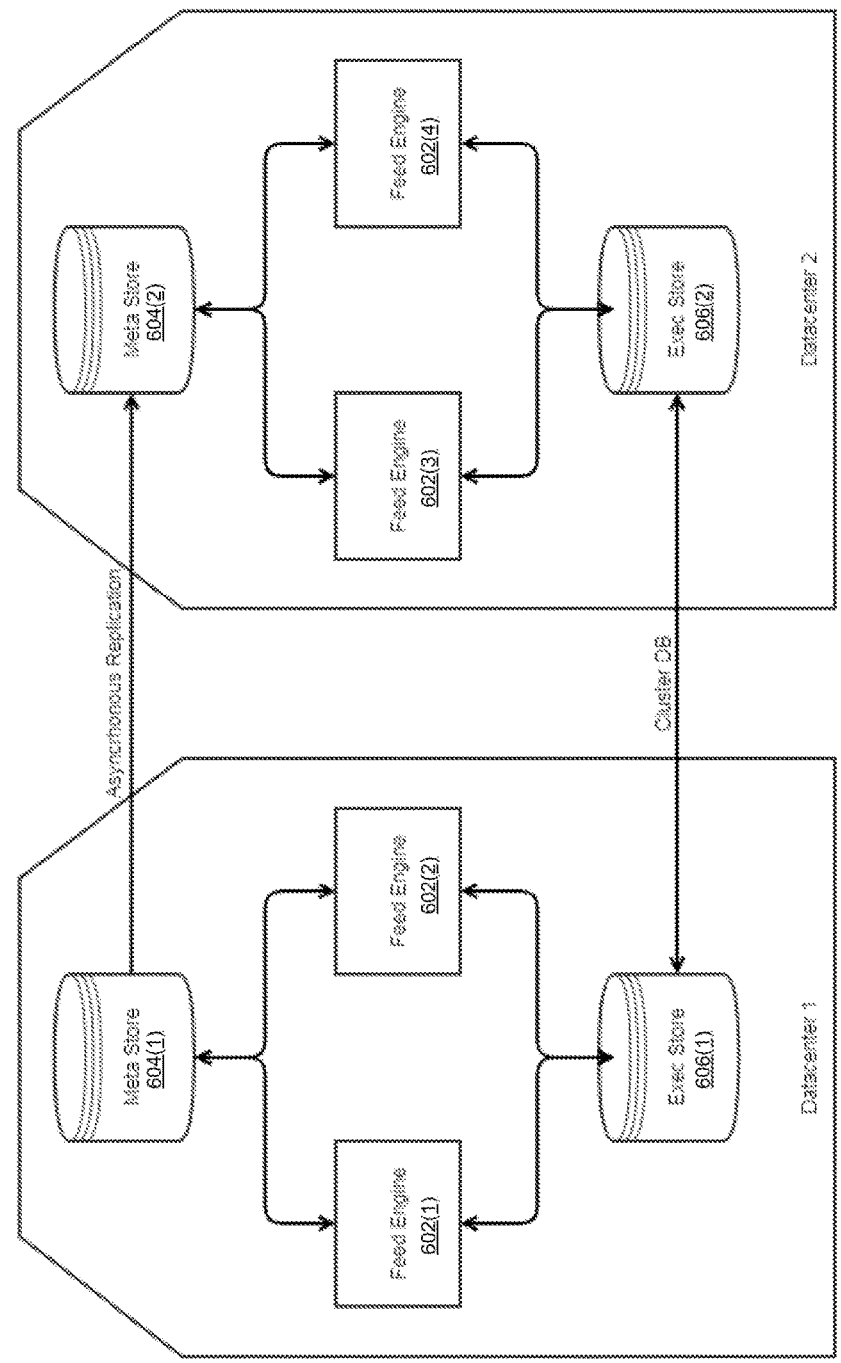
FIG. 6 illustrates a system diagram of executing multiple data extraction processes at the same time implemented by the automated data extraction, formatting, and distribution module of FIG. 4 in accordance with an exemplary embodiment.

FIG. 6 illustrates a system diagram 600 of executing multiple data extraction processes at the same time implemented by the ADEFDM 406 of FIG. 4 in accordance with an exemplary embodiment. Executing multiple data extraction processes at the same time is important as more and more processes are defined. To achieve that, according to exemplary embodiments, the ADEFDM 406 enables multiple instances of the process to be deployed across data centers. As disclosed above, locking is important to make sure the data extraction process is executed only once. In the ADEFDM 406 (i.e., in the feed engine), the locking mechanism is achieved by using the database locking.

For example, as illustrated in FIG. 6, a first datacenter 1 may include a Meta store 604(1) which may be in a bidirectional communication with a first feed engine 602(1) and a second feed engine 602(2) for data communication. Each of the first feed engine 602(1) and the second feed engine 602(2) may be in a bidirectional communication with an execution store 606(1) for data communication.

According to exemplary embodiments, a second datacenter 2 may include a Meta store 604(2) which may be in a bidirectional communication with a first feed engine 602(3) and a second feed engine 602(4) for data communication. Each of the first feed engine 602(3) and the second feed engine 602(4) may be in a bidirectional communication with an execution store 606(2) for data communication.

As illustrated in FIG. 6, according to exemplary embodiments, the Meta store 604(1) of the first datacenter 1 may communicate with the Meta store 604(2) of the second datacenter 2. Also, the execution store 606(2) of the first datacenter 1 may be in a bidirectional communication with the execution store 606(2) of the second datacenter 2 for data communication.

According to exemplary embodiments, multi-tenancy is an important concept where the ADEFDM 406 may be configured to host the service for multiple users and teams to take advantage of the service. However, it is important that the Meta data is segregated so users can only see what they must, and only perform actions on their Meta data. According to exemplary embodiments, this segregation process is achieved by the ADEFDM 406 by utilizing role-based access control (RBAC). Another key consideration is to enable runtime segregation so if one team requires heavy processing, those processes should not hog the entire ecosystem that other teams cannot use the process.

According to exemplary embodiments, there are multiple access control levels setup in the ADEFDM 406 (i.e. the feed engine). The first level is the type of action the user can perform on the feed engine. Some users can create data sets and define formatting requirements. Other users can use those data sets and define their data extraction processes using those data sets. Yet others can manually trigger the processes. According to exemplary embodiments, having a fine grained approach to RBAC enables the ADEFDM 406 to define multiple user types and provide them the right set of access.

In addition to the actions the users can perform, the ADEFDM 406 may also be configured to define the data set on which the user can perform those actions. For instance, according to an exemplary use case, it may be necessary that one team to not have access to data set of another team. This is enabled by defining access control at the data set level. Each data set defines who can access the data—either it is globally available to all users or it is specific to only one user type.

According to exemplary embodiments, runtime segregation allows for setting up extraction and distribution processes that are specific to a user/team. Configuration and Execution UI may still be the same, and so are the databases. However, the engines that execute the processes are segregated to avoid one team impacting another. Because the amount of information captured in Meta store (i.e., 604(1), 604(2)) and execution store (i.e., 606(1), 606(2)) is controlled by the ADEFDM 406 thereby by allowing those databases common across teams.

According to exemplary embodiments, to achieve multi-tenancy in the ADEFDM 406 (feed engine), a concept of category may be created. For example, the datasets and feeds are all categorized based on a pre-defined set of categories. The ADEFDM 406 (feed engine) may be configured to automatically guess the category based on historical knowledge or pre-configured rules but allows the user to override the category.

According to exemplary embodiments, the RBAC in the ADEFDM 406 may be based on the Category. Users are entitled to a category and that enables them to only see the data sets and feeds that are tagged against those categories. In addition, the user can only perform those actions that they are entitled to. For instance, a user that has access to projects and can create new data sets will have the ability to create new data sets for any data that is available in the projects data set.

According to exemplary embodiments, runtime segregation is again achieved using category. There are multiple instances of feed engine and each instance-cluster may only cater to one category, thereby enabling to have a cluster of engines per category.

Figure 7:
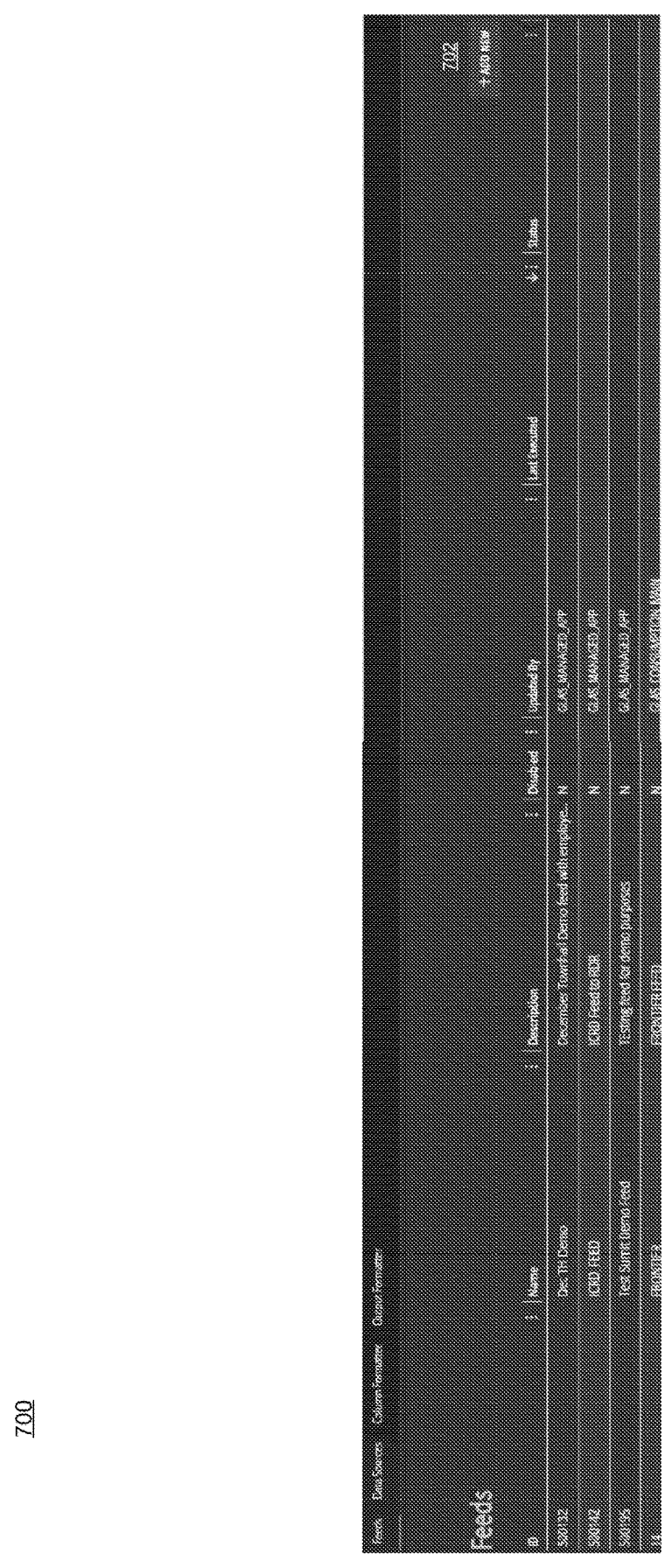
Figure 8:
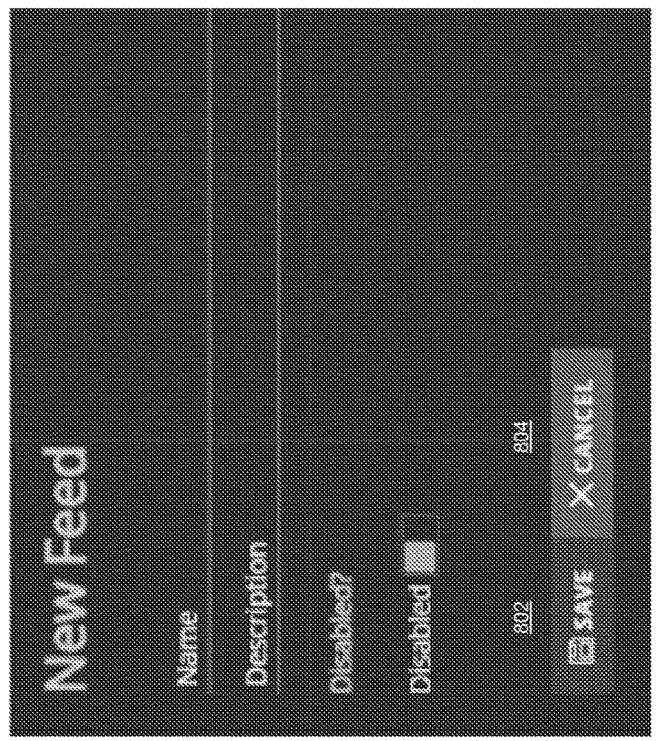
FIG. 8 illustrates an exemplary UI for defining data sets needed to be used in the feed in accordance with an exemplary embodiment.
Figure 9:
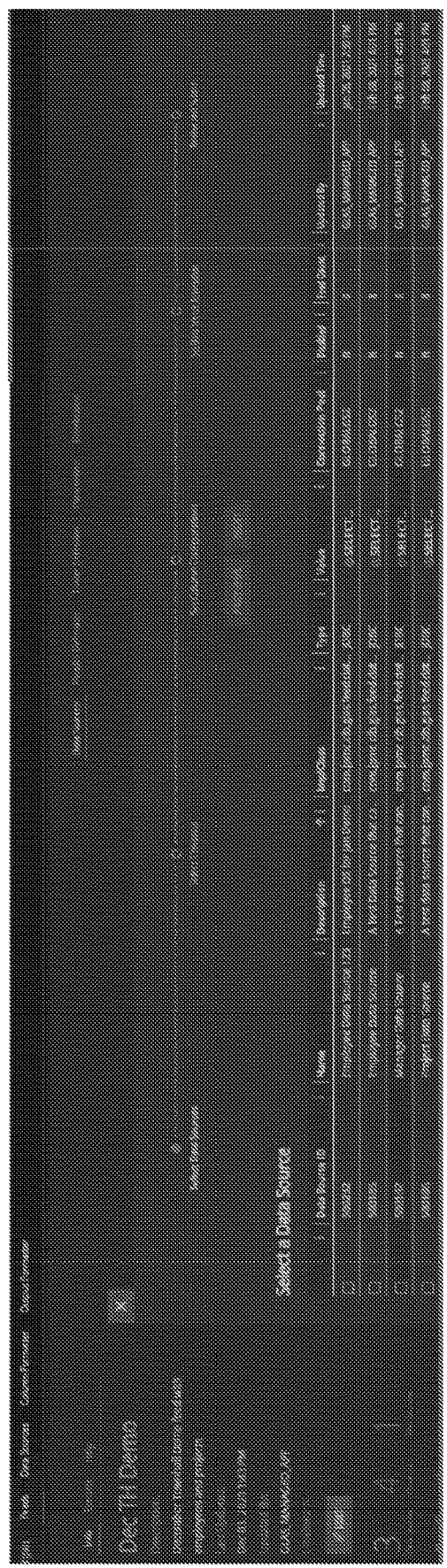
FIG. 9 illustrates an exemplary UI displaying reusable data sets in accordance with an exemplary embodiment.
Figure 11:
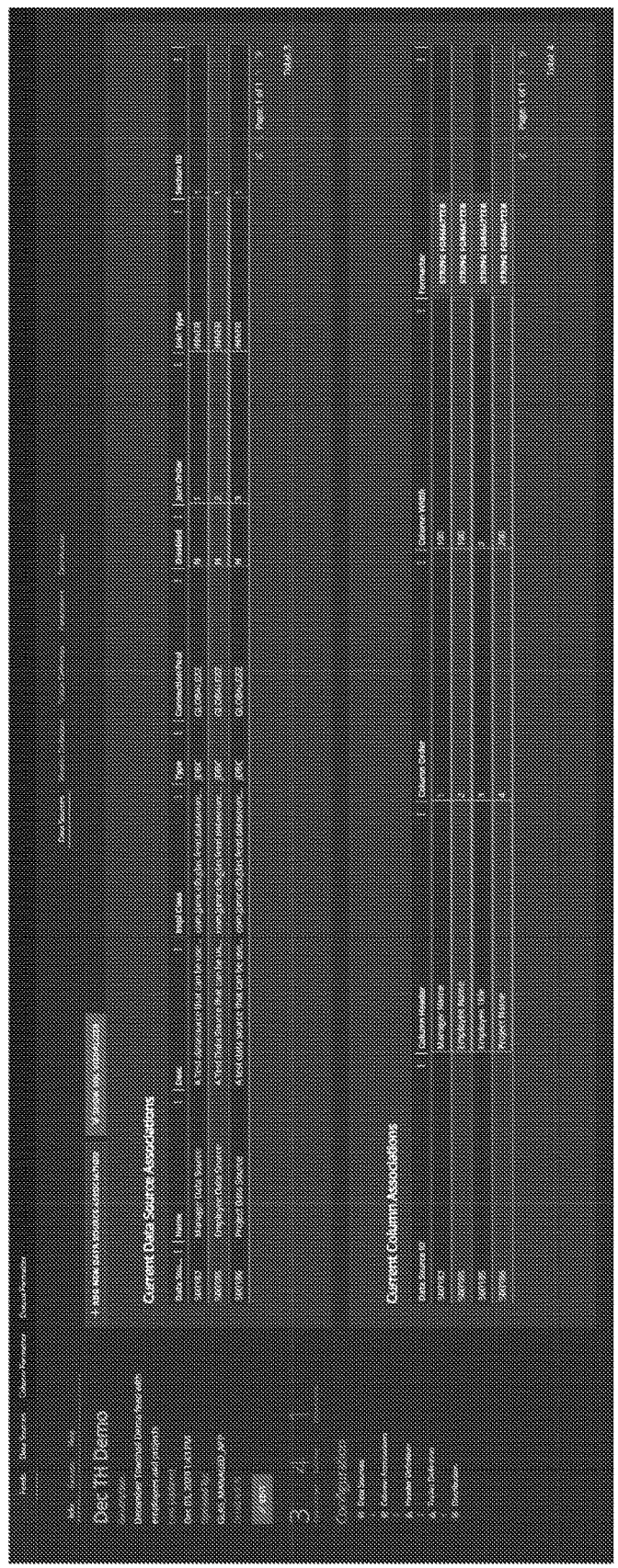
FIG. 11 illustrates an exemplary UI for selecting a transformation or formatting process needed for the selected data source columns of FIG. 10 in accordance with an exemplary embodiment.

According to exemplary embodiments, FIG. 7 illustrates an exemplary UI 700 for defining a new feed in accordance with an exemplary embodiment. FIG. 8 illustrates an exemplary UI 800 for defining data sets needed to be used in the feed in accordance with an exemplary embodiment. FIG. 9 illustrates an exemplary UI 900 displaying reusable data sets in accordance with an exemplary embodiment. FIG. 10 illustrates an exemplary UI 1000 for selecting data source columns in accordance with an exemplary embodiment. FIG. 11 illustrates an exemplary UI 1100 for selecting a transformation or formatting process needed for the selected data source columns of FIG. 10 in accordance with an exemplary embodiment.

The ADEFDM 406 may be utilized to implement the design and enable teams to automate the entire process of data extraction, transformation and distribution. As disclosed above, one of the design considerations for the process, among others, is achieving zero development and deployment effort. Users should be able to design a new extraction process from a UI, and no development effort should be needed. Processes may still need to be designed but they can be designed using the UI. Whereas, the term development, as used herein, may involve software engineers to develop or write some code. However, by utilizing the ADEFDM 406, a user can automate the development process by providing no development and deployment effort (i.e., the user does not need to develop or write code).

Referring back to FIGS. 4-11, the receiving module 414 may be configured to receive input data to create a feed from a user via a user interface (UI) 700. For example, a user (based on RABC) can click on the Add New icon 702 to create a new feed. This takes the user to a new screen (i.e., UI 800 as illustrated in FIG. 8) where the user can enter basic information of the feed and define the data set they need to use in the feed. The UI 800 guides the user through each step along the way. For example, according to exemplary embodiments, the defining module 416 may be configured to define, in response to receiving the input data to create the feed, reusable data sets to be utilized for creating the feed. The UI 800 also illustrates a save icon 802 which can be clicked by a user to save the basic information of the feed and a cancel icon 804 which can be clicked by the user to cancel an entry regarding the basic information of the feed.

According to exemplary embodiments, the display module 418 may be configured to display onto the UI (i.e., UI 900 as illustrated in FIG. 9) a plurality of first selectable icons for selecting exact data from the reusable data sets required for creating the feed. For example, in the screenshot of the UI 900, a user can see datasets related to project, employee, and manager. These data sets can be reused in other feeds as well. The user did not have to define these data sets but they are available to the user to use based on the user's entitlements.

According to exemplary embodiments, the selecting module 420 may be configured to select a desired number of the plurality of first selectable icons, wherein each of the selected first selectable icon is associated with a corresponding data source having columns (i.e., columns 1002 as illustrated in the UI 1000 in FIG. 10) to supply the exact data from the reusable data sets.

According to exemplary embodiments, the display module 418 may be configured to display onto the UI (i.e., UI 1100 as illustrated in FIG. 11) a plurality of second selectable icons for selecting a desired transformation or formatting process needed for the columns of each data source. For example, the user can also select any transformation or formatting needed for those columns 1002. Once done, the user can review and create a new feed.

According to exemplary embodiments, the selecting module 420 may be configured to select a desired number of the plurality of second selectable icons to select the desired transformation or formatting process.

According to exemplary embodiments, the creating module 422 may be configured to create the feed in response to selecting the desired transformation or formatting process. The defining module 416 may be configured to define a custom distribution process of the created feed from the UI. For example, the user can define the distribution strategy which can be either load the data to a database, email it to someone or sFTP it to another system by utilizing distributing module 424, but the disclosure is not limited thereto.

According to exemplary embodiments, the separating module 426 may be configured to separate data extraction process from transformation and distribution process; and the reusing module 428 may be configured to reuse the reusable data sets between multiple extraction processes.

According to exemplary embodiments, the implementing module 430 may be configured to implement a plug-n-play architecture to allow for framework expansion points.

Figure 12:
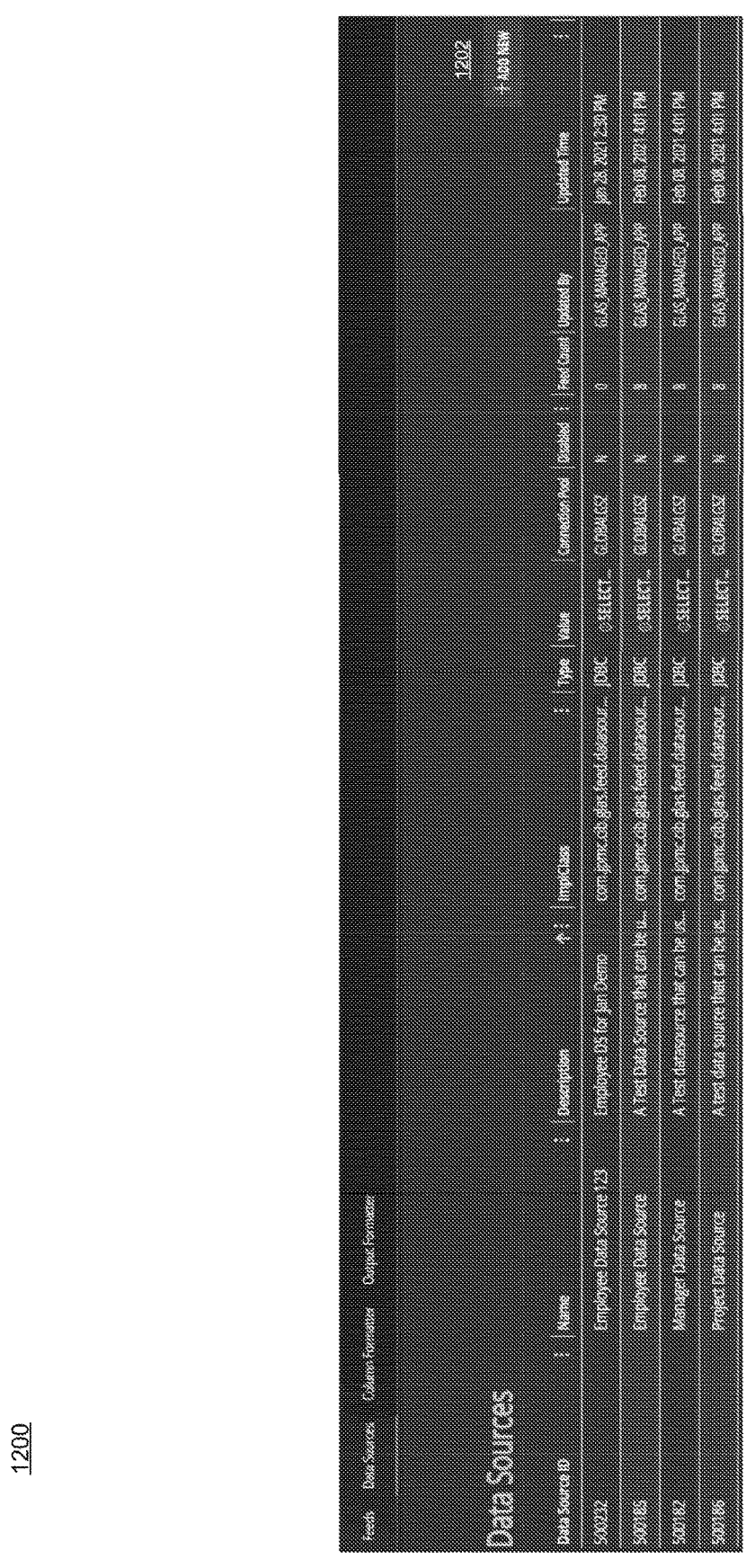

FIG. 12 illustrates an exemplary UI 1200 for creating a new data source or dataset by clicking the Add New button 1202 in a manner similar to the process of creating a new feed as disclosed above with respect to FIGS. 7-11.

Figure 13:
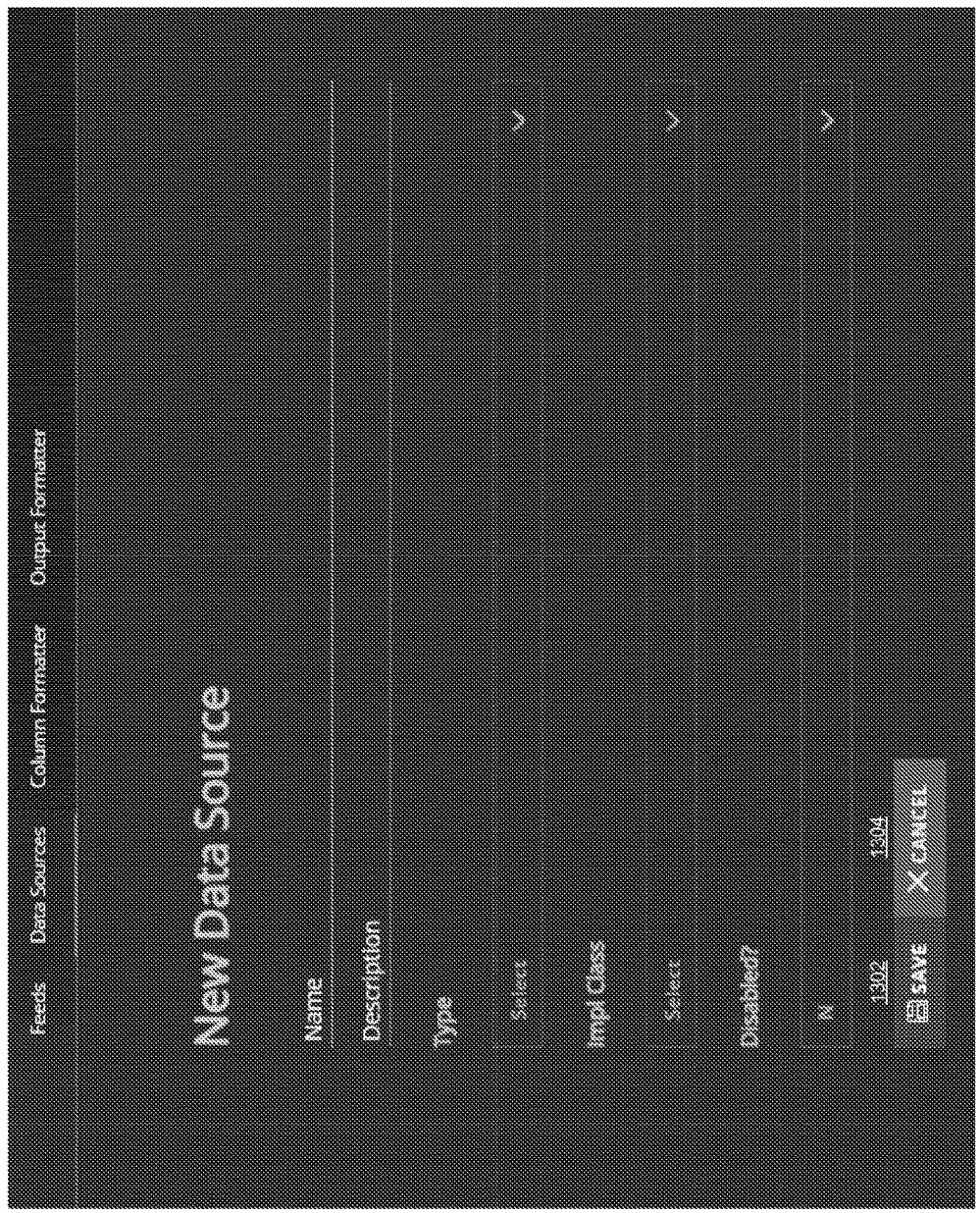
FIG. 13 illustrates an exemplary UI for defining the new data source in accordance with an exemplary embodiment.

FIG. 13 illustrates an exemplary UI 1300 for defining the new data source or dataset in accordance with an exemplary embodiment. For example, according to exemplary embodiments, the defining module 416 may be configured to define, in response to receiving the input data to create the data source or dataset, reusable data sets to be utilized for creating the new data source or dataset. The UI 1300 also illustrates a save icon 1302 which can be clicked by a user to save the basic information of the data source or dataset and a cancel icon 1304 which can be clicked by the user to cancel an entry regarding the basic information of the new data source or dataset.

Figure 14:
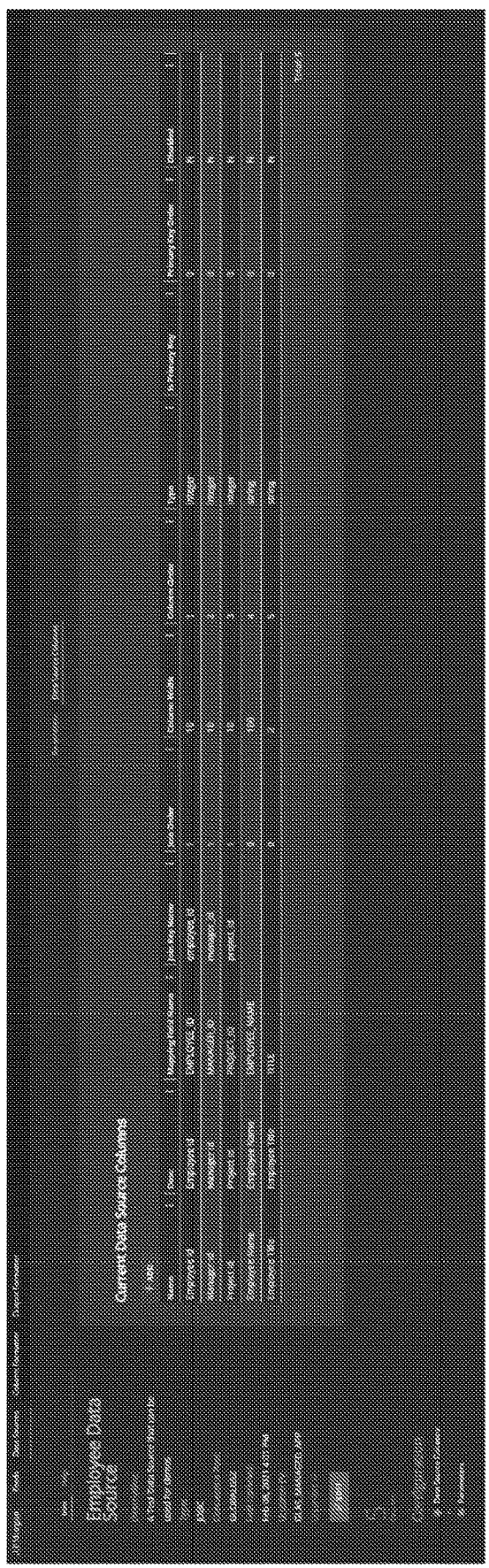
FIG. 14 illustrates an exemplary UI displaying current data source columns in accordance with an exemplary embodiment.

FIG. 14 illustrates an exemplary UI 1400 displaying current data source columns in accordance with an exemplary embodiment.

According to exemplary embodiments, the UIs, 700. 800, 900, 1000, 1100, 1200, 1300, and 1400 may be implemented by the GUI 434.

Referring back to FIG. 4, according to exemplary embodiment, the ADEFDM 406 may be configured to implement a configuration or user interface (UI) driven approach for extracting data, formatting and distributing the data to other systems in a chain, thereby requiring no development or deployment effort for new feeds (i.e., data in a particular format), but the disclosure is not limited thereto. For example, the ADEFDM 406 of the present disclosure allows for configuring new data extraction processes right from the UI, thereby reducing TTM and any need for a software engineering team to be involved for creating new processes; integrating with event and time based triggers and reusable data sets; reutilizing data sets between processes, thereby eliminating the need to maintain the same data extraction setup between different processes and thus reducing maintenance costs, but the disclosure is not limited thereto.

According to exemplary embodiment, the ADEFDM 406 may also be configured to implement the following processes, including but not limited thereto: UI driven approach to defining extraction, transformation and distribution logic; plug-n-play architecture to allow for framework expansion points (for instance, easily add another data source such as Hive); built in trigger mechanism to not only define the extraction process, but also define when the extraction needs to be executed—from one time trigger to always on triggers; separation of data extraction from transformation and distribution that enables data sets to be reused between multiple extraction processes; configuration driven auto retry and rerun mechanism to cater for process failures; controls to allow for multi-tenancy usage with data and runtime segregation, etc., but the disclosure is not limited thereto.

A feed may generally refer to a file that has the required data in a particular format. However, in the automated data extraction, formatting and distribution module (may also be referred to as a feed engine) of the instant disclosure, the term feed has been utilized as formatted data. It doesn't necessarily have to be a file. The data can also be stored in an RDBMS (Relational Database Management System) database, but the disclosure is not limited thereto.

A data source as disclosed herein may refer to a source for the data. It can be a database, a file, NoSQL store, etc., but the disclosure is not limited thereto.

A data set as disclosed herein may refer to a logical representation of some data. For instance, an employee table in an RDBMS database is a data set. One novel aspect, among others, of the ADEFDM 406 (feed engine) as disclosed herein is that it allows data sets to be reused, but the disclosure is not limited thereto. Conventional tools lack this feature of reusing data sets.

A trigger as disclosed herein may be a mechanism by which the data extraction process will be initiated, but the disclosure is not limited thereto.

According to exemplary embodiments, a feed that is created in a lower environment is an exportable artifact. When the user exports the feed from the UI, all the corresponding entities are exported in an XML format that can then be imported in another environment.

According to exemplary embodiments, just like exporting, importing allows an XML to be uploaded to feed engine via a UI to create a new feed or new entities (such as a dataset).

According to exemplary embodiments, the ADEFDM 406 may be configured to implement controls to ensure that when the metadata is imported in production, it would not cause an adverse impact. For example, the ADEFDM 406 may be configured to implement an approval flow to make sure someone other than the creator reviews the changes and approves those changes. The ADEFDM 406 may also be configured to implement an execute feature that allows for the feed to be executed in a sandbox so the creator and approver can both be comfortable with the format, the data, and the setup.

Figure 15:
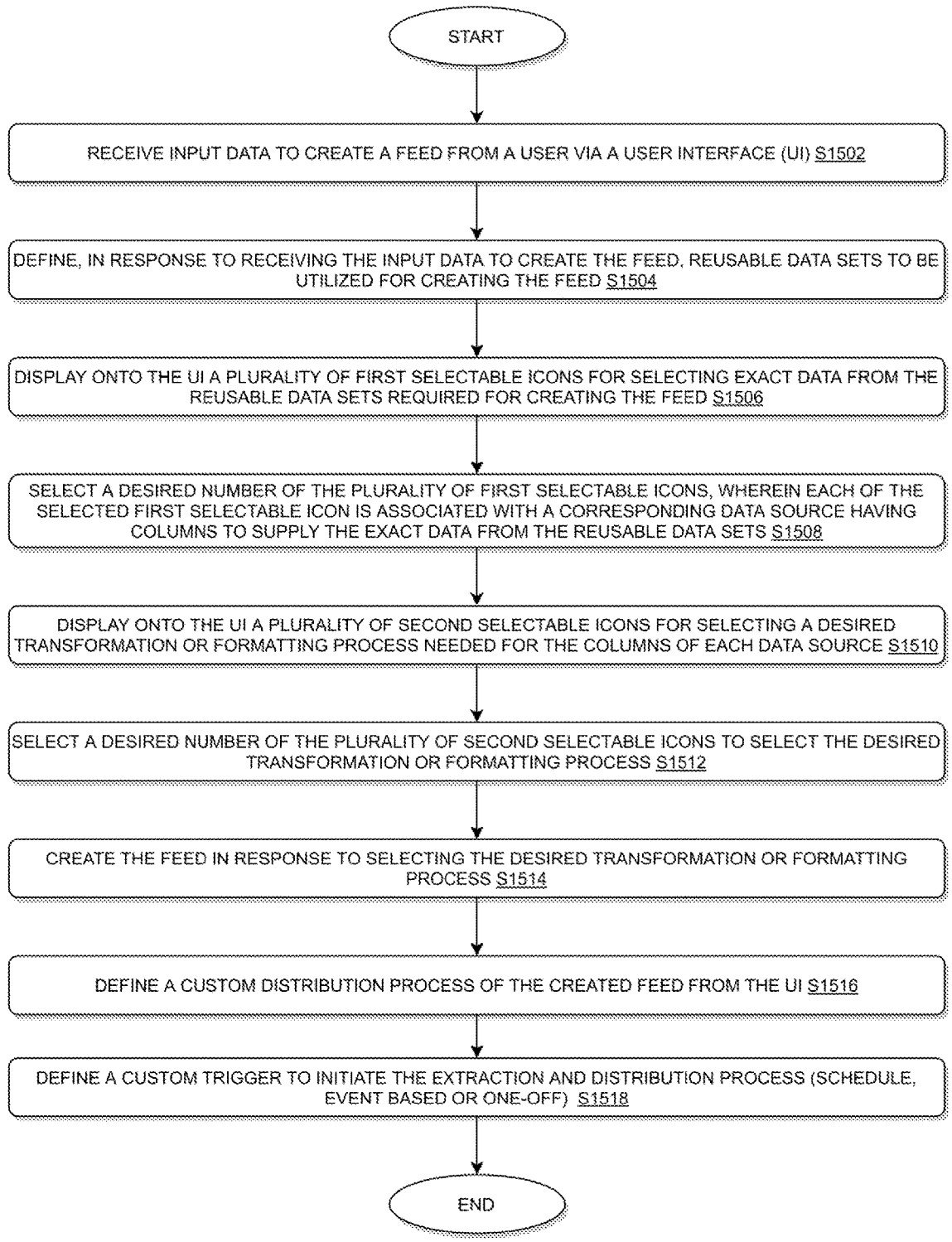
FIG. 15 illustrates a flow chart for implementing an automated data extraction, formatting, and distribution module in accordance with an exemplary embodiment.

FIG. 15 illustrates a flow chart of a process 1500 implemented by the ADEFDM 406 of FIG. 4 in accordance with an exemplary embodiment.

As illustrated in FIG. 15, at step 1502, the process 1500 may include receiving input data to create a feed from a user via a user interface (UI).

At step 1504, the process 1500 may include defining, in response to receiving the input data to create the feed, reusable data sets to be utilized for creating the feed.

At step 1506, the process 1500 may include displaying onto the UI a plurality of first selectable icons for selecting exact data from the reusable data sets required for creating the feed.

At step 1508, the process 1500 may include selecting a desired number of the plurality of first selectable icons, wherein each of the selected first selectable icon is associated with a corresponding data source having columns to supply the exact data from the reusable data sets.

At step 1510, the process 1500 may include displaying onto the UI a plurality of second selectable icons for selecting a desired transformation or formatting process needed for the columns of each data source.

At step 1512, the process 1500 may include selecting a desired number of the plurality of second selectable icons to select the desired transformation or formatting process.

At step 1514, the process 1500 may include creating the feed in response to selecting the desired transformation or formatting process.

At step 1516, the process 1500 may include defining a custom distribution process of the created feed from the UI. According to exemplary embodiments, the process 1500 may further include distributing the created feed to a plurality of systems with different file names or at different locations.

At step 1518, the process 1500 may include defining a custom trigger to initiate the extraction and distribution process (schedule, event based or one-off), but the disclosure is not limited thereto.

According to exemplary embodiments, the process 1500 may further include separating data extraction process from transformation and distribution process; and reusing the reusable data sets between multiple extraction processes.

According to exemplary embodiments, the process 1500 may further include implementing a plug-n-play architecture to allow for framework expansion points.

According to exemplary embodiments, the ADEFDD 402 may include a memory (e.g., a memory 106 as illustrated in FIG. 1) which may be a non-transitory computer readable medium that may be configured to store instructions for implementing an ADEFDM 406 as disclosed herein. The ADEFDD 402 may also include a medium reader (e.g., a medium reader 112 as illustrated in FIG. 1) which may be configured to read any one or more sets of instructions, e.g., software, from any of the memories described herein. The instructions, when executed by a processor embedded within the ADEFDM 406 or within the ADEFDD 402, may be used to perform one or more of the methods and processes as described herein. In a particular embodiment, the instructions may reside completely, or at least partially, within the memory 106, the medium reader 112, and/or the processor 104 (see FIG. 1) during execution by the ADEFDD 402.

According to exemplary embodiments, the instructions, when executed, may cause the processor 104 to perform the following: causing a receiver to receive input data to create a feed from a user via a user interface (UI); defining, in response to receiving the input data to create the feed, reusable data sets to be utilized for creating the feed; displaying onto the UI a plurality of first selectable icons for selecting exact data from the reusable data sets required for creating the feed; selecting a desired number of the plurality of first selectable icons, wherein each of the selected first selectable icon is associated with a corresponding data source having columns to supply the exact data from the reusable data sets; displaying onto the UI a plurality of second selectable icons for selecting a desired transformation or formatting process needed for the columns of each data source; selecting a desired number of the plurality of second selectable icons to select the desired transformation or formatting process; creating the feed in response to selecting the desired transformation or formatting process; and defining a custom distribution process of the created feed from the UI.

According to exemplary embodiments, wherein, the instructions, when executed, may further cause the processor 104 to perform the following: distributing the created feed to a plurality of systems with different file names or at different locations.

According to exemplary embodiments, wherein, the instructions, when executed, may further cause the processor 104 to perform the following: separating data extraction process from transformation and distribution process; and reusing the reusable data sets between multiple extraction processes.

According to exemplary embodiments, wherein, the instructions, when executed, may further cause the processor 104 to perform the following: implementing a plug-n-play architecture to allow for framework expansion points.

According to exemplary embodiments as disclosed above in FIGS. 1-15, technical improvements effected by the instant disclosure may include a platform for implementing an automated data extraction, formatting, and distribution module that implements a configuration or user interface (UI) driven approach for extracting data, formatting and distributing the data to other systems in a chain, thereby requiring no development or deployment effort for new feeds (i.e., data in a particular format), but the disclosure is not limited thereto. For example, according to exemplary embodiments as disclosed above in FIGS. 1-15, technical improvements effected by the instant disclosure may include a platform for implementing an automated data extraction, formatting, and distribution module that allows for configuring new data extraction processes right from the UI, thereby reducing TTM and any need for a software engineering team to be involved for creating new processes; integrating with event and time based triggers and reusable data sets; reutilizing data sets between processes, thereby eliminating the need to maintain the same data extraction setup between different processes and thus reducing maintenance costs, but the disclosure is not limited thereto.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for implementing an automated data extraction, formatting, and distribution module, the method comprising:
   implementing, by a processor, an automated data extraction, formatting, and distribution module to define reusable data sets;
   defining, in response to receiving an input data from a user, the reusable data sets to be reused between multiple extraction processes to create a feed;
   displaying onto a user interface (UI) a plurality of first selectable icons for selecting exact data defined from received input data to create reusable data sets required for creating the feed, wherein the feed is a formatted data that can be stored in a database management system, wherein the database management system incorporates a relational-data model including a Structured Query Language (SQL) application programming interface;
   selecting, by the processor, a desired number of the plurality of first selectable icons, wherein each first selectable icon of the selected first selectable icons corresponds each data source of data sources having columns to supply the exact data from the reusable data sets;
   displaying onto the UI a plurality of second selectable icons different from the first selectable icons for selecting a desired transformation or formatting process needed for the columns of said each data source;
   selecting, by the processor, a desired number of the plurality of second selectable icons to select the desired transformation or formatting process;
   creating, by the processor via the UI in real time, the feed in response to the selecting the desired transformation or formatting process; and
   defining, by the processor, a custom distribution process of the created feed from the UI to eliminate maintaining same data extraction setup between the processes, wherein the custom distribution process comprising: distributing the created feed to a plurality of systems with different file names or at different locations; and integrating the automated data extraction, formatting, and distribution module with event and time based on triggers and the reusable data sets.

2. The method according to claim 1, wherein each data set is a logical representation of some data that can be reused.

3. The method according to claim 1, wherein the data source is selected from one or more of following: a database, a file, a WebService call, a script, and a NoSQL (NoStructured Query Language) store.

4. The method according to claim 1, further comprising: separating data extraction process from transformation and distribution process.

5. The method according to claim 1, further comprising: implementing a architecture to allow for framework expansion points.

6. A system for implementing an automated data extraction, formatting, and distribution module, the system comprising:
   a processor; and a memory operatively connected to the processor via a communication interface, the memory storing computer readable instructions, when executed, causes the processor to:
   implement an automated data extraction, formatting, and distribution module to define reusable data sets;
   define, in response to receiving an input data from a user, the reusable data sets to be reused between multiple extraction processes to create a feed;
   display onto a user interface (UI) a plurality of first selectable icons for selecting exact data defined from received input data to create reusable data sets required for creating the feed, wherein the feed is a formatted data that can be stored in a database management system, wherein the database management system incorporates a relational-data model including a Structured Query Language (SQL) application programming interface;
   select a desired number of the plurality of first selectable icons, wherein each first selectable icon of the selected first selectable icons corresponds each data source of data sources having columns to supply the exact data from the reusable data sets;
   display onto the UI a plurality of second selectable icons different from the first selectable icons for selecting a desired transformation or formatting process needed for the columns of said each data source;
   select a desired number of the plurality of second selectable icons to select the desired transformation or formatting process,
   create via the UI in real time, the feed in response to the selecting the desired transformation or formatting process; and
   define a custom distribution process of the created feed from the UI to eliminate maintaining same data extraction setup between the processes, wherein the custom distribution process comprising: distributing the created feed to a plurality of systems with different file names or at different locations; and integrating the automated data extraction, formatting, and distribution module with event and time based on triggers and the reusable data sets.

7. The system according to claim 6, wherein each data set is a logical representation of some data that can be reused.

8. The system according to claim 6, wherein the data source is selected from one or more of following: a database, a file, a WebService call, a script, and a NoSQL (NoStructured Query Language) store.

9. The system according to claim 8, wherein the processor is further configured to: separate data extraction process from transformation and distribution process.

10. The system according to claim 6, wherein the processor is further configured to: implement a architecture to allow for framework expansion points.

11. A non-transitory computer readable medium configured to store instructions for implementing an automated data extraction, formatting, and distribution module, wherein, when executed, the instructions cause a processor to perform following:
    implementing, by the processor, an automated data extraction, formatting, and distribution module to define reusable data sets;
    defining, in response to receiving an input data from a user, the reusable data sets to be reused between multiple extraction processes to create a feed;
    displaying onto a user interface (UI) a plurality of first selectable icons for selecting exact data defined from received input data to create reusable data sets required for creating the feed, wherein the feed is a formatted data that can be stored in a database management system, wherein the database management system incorporates a relational-data model including a Structured Query Language (SQL) application programming interface;

selecting, by the processor, a desired number of the plurality of first selectable icons, wherein each first selectable icon of the selected first selectable icons corresponds each data source of data sources having columns to supply the exact data from the reusable data sets;

displaying onto the UI a plurality of second selectable icons different from the first selectable icons for selecting a desired transformation or formatting process needed for the columns of said each data source;

selecting, by the processor, a desired number of the plurality of second selectable icons to select the desired transformation or formatting process;

creating, by the processor via the UI in real time, the feed in response to the selecting the desired transformation or formatting process; and defining, by the processor, a custom distribution process of the created feed from the UI to eliminate maintaining same data extraction setup between the processes, wherein the custom distribution process comprising: distributing the created feed to a plurality of systems with different file names or at different locations; and integrating the automated data extraction, formatting, and distribution module with event and time based on triggers and the reusable data sets.

12. The non-transitory computer readable medium according to claim 11, wherein each data set is a logical representation of some data that can be reused.

13. The non-transitory computer readable medium according to claim 11, wherein the data source is selected from one or more of following: a database, a file, a Web-Service call, a script, and a NoSQL (NoStructured Query Language) store.

14. The non-transitory computer readable medium according to claim 11, wherein, when executed, the instructions further cause the processor to perform following: separating data extraction process from transformation and distribution process; and reusing the reusable data sets between multiple extraction processes.

* * * * *